J. WOLPERT.
Plow and Cultivator.
No. 101,200. Patented March 22, 1870.
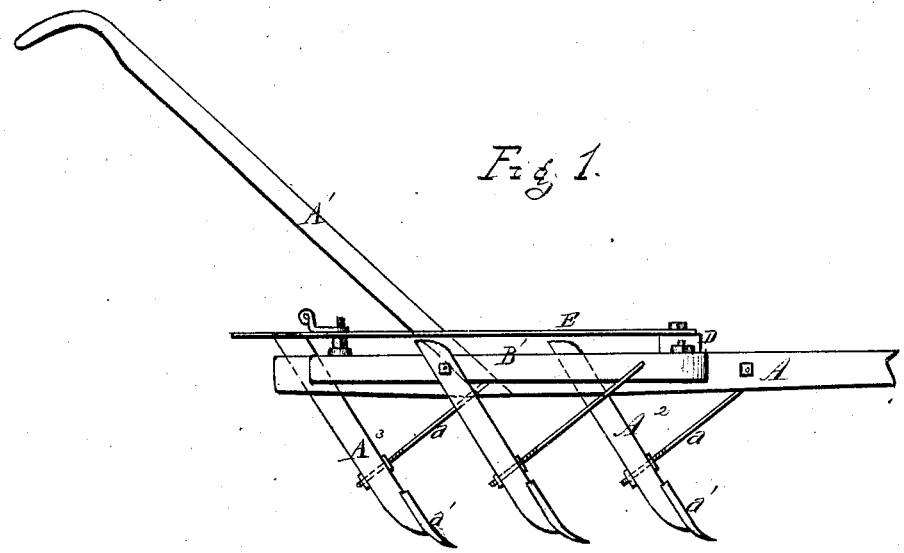
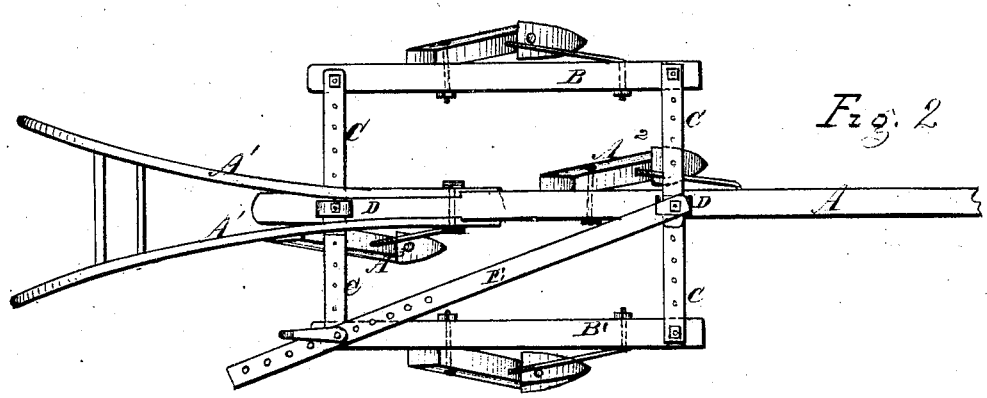
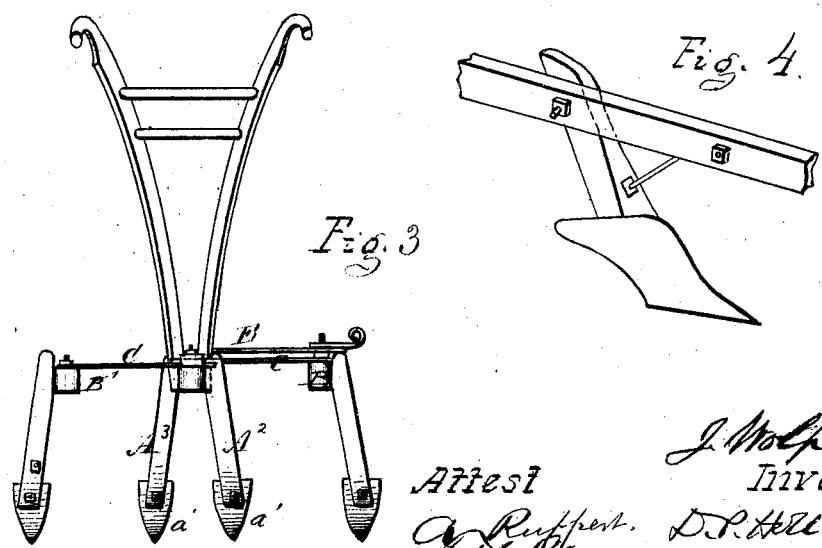

United States Patent Office.

JOHN WOLPERT, OF LOUISVILLE, KENTUCKY.

Letters Patent No. 101,200, dated March 22, 1870.

IMPROVEMENT IN COMBINED PLOW AND CULTIVATOR.

The Schedule referred to in these Letters Patent and making part of the same.

*To all whom it may concern:*

Be it known that I, JOHN WOLPERT, of Louisville, in the county of Jefferson and State of Kentucky, have invented certain Improvements in Cultivators; and I do hereby declare that the following is a full, clear, and exact description thereof, reference being had to the annexed drawings making part of this specification, in which—

Figure 1 is a side elevation, the machine being arranged as a four-shovel cultivator.

Figure 2 is a plan view of the same.

Figure 3 is a rear elevation.

Figure 4 is a perspective view of a turning plow.

The same letters are used in all the figures to designate identical parts.

My invention relates to a machine for cultivating corn or other crops planted in rows; and my improvements consist in the construction, combination, and arrangement of some of the parts, to the end that the implement may be converted from a four into a three or two-shovel plow, or into a double-turning plow, as will more fully appear from the following description and claims.

To enable those skilled in the art to make and use my invention, I will proceed to describe its construction and operation.

A in the drawings represents the center beam to which all the other parts are to be attached.

To its front end the horses are to be hitched; and upon its rear portion the handles $A^1$ are fastened by which to guide it.

$A^2$ and $A^3$ are two standards secured upon opposite sides of the center beam by bolts, and braced by rods $a$ $a$ in the usual manner, and carrying upon their lower ends shovels $a'$ $a'$. The attachment of the shovels to their lower ends is such as to put them in a vertical position.

B B' represent two parallel beams secured to the center beam by means of cross-bars.

Each of these beams is provided with a standard having a shovel; the position of such standards with reference to those on the center beam being such, that when they are directly opposite each other they shall be about midway between the front and rear shovel of the center beam.

When the implement is to be used as a double-turning plow, the parallel beams B and B' are removed, and similar beams provided with turning-molds, as shown in fig. 4, are substituted instead, and also the center beam and standard with their shovels are detached.

C C and C C represent bars of metal which are coupled in pairs by clips D D, and turn upon bolts holding them and the clips to the center beam.

The outer ends of these bars are attached by bolts, upon which they turn, to the parallel beams B B', respectively, supporting the same.

Their inner ends are coupled, as already stated, by the clips D, so that each pair ordinarily constitutes one rigid bar.

The object of making them in two pieces is, that when it becomes necessary to remove one of the side beams in order to convert the implement into a three-shovel cultivator, those ends of the bars which supported this side beam may be removed together with it, thus offering no obstruction upon this side of the machine.

From the above described construction of the machine it may be seen that the side beams can be brought nearer to or removed further from the center beam by throwing one or the other of them forward.

In order to sustain the side beams in any desired position I provide a brace, E, the forward end of which is pivoted upon a stud on the center beam; in this instance I have shown it attached to the projecting end of the bolt which holds the forward cross-bar to the center beam, and which extends thence to the rear, diagonally across the machine, where its rear portion is coupled to a bolt or stud on the rear end of one or the other of the side beams, held on such bolt by a nut, as clearly shown. This brace is in its rear portion provided with a series of holes so as to enable it to hold the side beams in different positions.

To convert the four-shoveled cultivator shown in the drawings into a three or double-shovel one, it is only necessary to detach one or both side beams with their supports.

Having thus described my invention,

What I claim, and desire to secure by Letters Patent, is—

The combination of the swiveling-bars C C, clips D, side beams B B', and brace E, all arranged to operate substantially as and for the purpose set forth.

In testimony whereof I have signed my name to this specification in the presence of two subscribing witnesses.

JOHN WOLPERT.

Witnesses:
WM. STINETT,
FRUBT KORNFIELD.